June 4, 1935. R. L. MELTON ET AL 2,003,863
APPARATUS FOR DETERMINING TOUGHNESS OR RESISTANCE
TO BREAKAGE OF ABRASIVE BODIES BY IMPACT
Filed Oct. 9, 1929
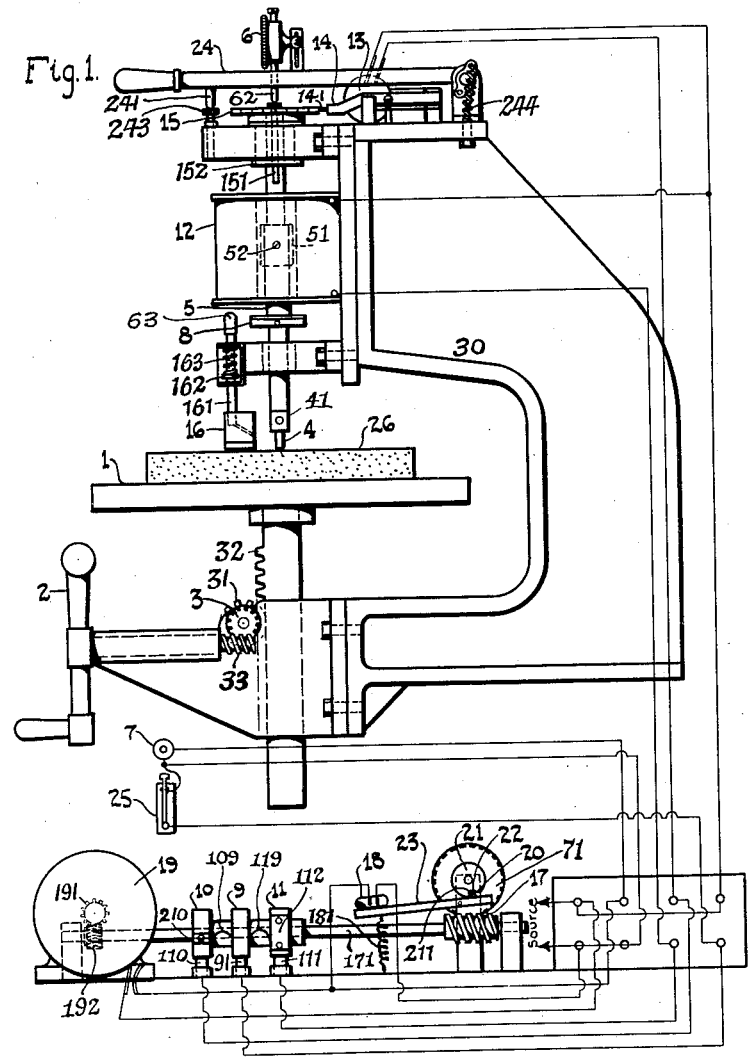
INVENTORS
Romir Lee Melton
John Fitzpatrick
by Popp & Powers
ATTORNEYS Patented June 4, 1935

2,003,863

UNITED STATES PATENT OFFICE 2,003,863

APPARATUS FOR DETERMINING TOUGHNESS OR RESISTANCE TO BREAKAGE OF ABRASIVE BODIES BY IMPACT

Romie Lee Melton and John Fitzpatrick, Niagara Falls, N. Y., assignors to The Carborundum Company, Niagara Falls, N. Y., a corporation of Pennsylvania Application October 9, 1929, Serial No. 398,468

10 Claims. (Cl. 265—13)

This invention has relation to apparatus for testing the toughness or resistance to disintegration under impact of abrasive or granular bodies and similar mineral substances so that they may be classified according to this characteristic and selected for specific purposes.

Abrasive bodies are regularly made in a variety of grades with regard to toughness, hardness and porosity, depending upon the particular work which they are to do. This range of grades is obtained in artificial abrasives, such as silicon carbide, by changes in the methods of manufacture, such as the use of different bonding materials, methods of baking and firing, and also in the character of abrasive materials used. However, it is difficult, or practically impossible, to manufacture abrasive bodies so that they will have a predetermined degree of toughness and be best suited for a specific purpose. Therefore, it is desirable to have some simple and reliable device by which the toughness of finished abrasive bodies can be tested and so be able to determine whether or not they conform to specifications or are suitable for the particular work for which they are intended.

One of the objects of this invention then is to provide apparatus for testing the toughness of abrasive bodies after their manufacture in a simple, reliable, and inexpensive manner.

Another object of this invention is the provision of an impact testing device whereby the testing operation is accomplished by means of electromagnets and a motor driven contact mechanism which is a distinct departure from the art and in addition gives a very smooth operation, renders friction negligible and permits the plunger to practically drop as freely as a falling body.

This testing device is designed primarily to utilize the impact principle of determining the characteristics of abrasive bodies, and other articles, and more particularly the toughness of the same, by exerting a definite amount of work, in the form of impact blows, directed against the body or article under test, the detritus formed by preceding blows being removed from the point of impact or rendered innocuous.

In the accompanying drawing:

Figure 1 is a side elevation of an apparatus embodying an approved form of our invention and showing the electric mechanism and circuits in connection therewith diagrammatically.

Figure 2 is a top view thereof.

In the following description, similar characters of reference indicate like parts in both figures of the drawing:—

The numeral 30 represents the main frame of the apparatus which may be of any suitable construction to support the working parts of the machine. On the lower part of this frame is mounted a table 1 which is adapted to support the body which is to be tested for determining its characteristics, as for example, an abrasive member 26 which is to be tested for toughness or resistance to breakage under a load such as an impact. This table is preferably capable of vertical adjustment and this may be accomplished by various means, those shown in Fig. 1 being satisfactory and consisting of a gear rack 32 slidable vertically in a guideway on the lower part of the frame, a gear wheel 31 journaled on the frame and meshing with the gear rack, and a rotary handle 2 journaled on the frame and provided with a worm 33 which meshes with a worm wheel 3 which is connected to drive the gear wheel 31.

Above the table is arranged the point, drill, or bit 4 of the tool which is adapted to engage the upper side of the test piece or body 26 and which may be of any suitable form so that upon striking the test piece it will cut or break down a part of the same and form a mark or recess therein. This tool is mounted in a detachable chuck 41, which is threaded into the lower end of a vertically reciprocating and intermittently rotating plunger or ram 5, the lower part of which is guided on the main frame.

Raising of this plunger and the cutting tool is effected by electromagnetic means but the descent of the same is effected solely by gravity so that the impact delivered by the tool point against the work or test piece 26 is dependent upon the free falling weight of the plunger and tool. Although this electromagnetic lifting mechanism and its automatic controlling switch mechanism may be variously constructed the form of the same shown in the drawing is satisfactory and as there shown the same is contructed as follows:—

The numeral 12 represents a solenoid which surrounds the central part of the plunger 5, the latter being made of iron to serve as a core or armature therefor. One end of the solenoid coil is connected to one side of the source of electrical energy and the other end of the coil is connected to the brush contact 111, which completes an electrical circuit for a predetermined length of time during each cycle of operations of the machine through the rotary contacts 9, 11 mounted on a switch shaft 171 which is driven by an electric motor 19 by means of a worm 191 and worm gear 192 secured respectively to the shaft of this motor and to the switch shaft 171. The rotating parts 9, 10, 11 are of an electrically insulating material but have electrical conducting segments 210, 112 inserted in the members 10, 11 respectively, and electrically connected by means of the jumper connections 109, 119 to a conducting ring which covers the entire periphery of the member 9 and makes continuous electrical contact with the brush contact 91. With each revolution of the shaft 171 the conducting segment 112 makes contact with the brush contact 111 thereby completing an electrical circuit through the brush contact 91, rotary contact 9, jumper connector 119, conducting segment 112, brush contact 111 to the solenoid coil 12, thereby energizing said solenoid, the magnetic pull of which raises the plunger 5 to a definite height above the abrasive article 26. Further rotation of the shaft 171 causes the conducting segment 112 to move away from the brush contact 111 thereby breaking the electrical circuit to the solenoid coil 12, the magnetic pull of which becomes zero and the plunger falls practically as a free body.

If desired, the machine may be stopped before the regular number of impact blows have been made by opening the normally closed switch 25 which breaks the electrical circuit to the solenoid 12 and electromagnetic coil 13. Opening the above mentioned switch 25 stops the operation of the impact testing device but permits the control mechanism to continue to run until the cam 21 has made a complete revolution and the electrical circuit to the driving motor 19 is broken by the action of the mercury switch 18. Starting of the motor may be effected by a starting switch 7 having preferably the form of a push button which closes the circuit across the open contacts in the mercury switch 18 until the trip pin 22 engages the periphery of the high face of the timing disc 21 and the mercury container is tilted so as to close the switch contacts associated therewith. After a definite number of impact blows have been struck the electrical circuit to the driving motor is automatically broken, thereby stopping the control mechanism by the above mentioned mercury switch 18 which is of the usual and well known construction in which a floating body of mercury is moved from one part of a glass container to another and thereby either bridges two contacts in said container for closing the circuit of which they form a part, or is moved away from one or both of said contacts for breaking the respective circuit. Tilting of the mercury container for this purpose is effected by mounting the same on one arm of a vertically swinging lever 23 the opposite arm of which has a trip pin 22 adapted to engage a notch or cut-away 211 in the periphery of a control or timing disk or cam 21 which is turned by a worm wheel 71 connected with the timing disk and meshing with a worm 17 on the switch shaft 171. When the trip pin 22 engages the periphery of the high face of the timing disk 21 the mercury container is tilted so as to close the switch contacts associated therewith but when the notch 211 in this disk is presented to this pin the latter is raised into this notch by the action of the spring 181, and as the latter rises the switch 18 is opened. The timing of the mechanism which operates the mercury switch 18 and the rotary switch contacts 9, 10, 11 is such that the circuits of the solenoid 12 and electromagnetic coil 13 are opened and closed a predetermined number of times and the plunger and tool are thereby raised and permitted to drop a corresponding number of times between each starting and stopping operation of the motor 19, for example, the shaft 171 may be turned twenty-five times during each rotation of the timing disk or cam 21, whereby the plunger and tool will be reciprocated a corresponding number of times. While the plunger and impact tool are raised from the test piece the same are turned part way each time so as to present the tool in different positions to the test piece and cause the tool to cut or drill a circular recess into the test piece during each cycle of operation.

The means whereby this intermittent rotary movement is imparted to the plunger and tool are preferably constructed as follows:—

The numeral 15 represents a ratchet wheel having a hub 152 which is journaled in the upper part of the frame and receives the upper part of the plunger, the latter and the ratchet wheel being compelled to turn together but the plunger being free to slide vertically in this hub by a spline 151. On top of the frame is mounted the coil 13 of an electromagnet, one end of which is connected to one side of the source of electrical energy, the other end being connected to the brush contact 110 which with each revolution of the shaft 171 completes an electrical circuit through the conducting segment 210, jumper connection 109, rotary contact 9, to brush contact 91, which is connected through a normally closed switch 25 to the other side of the source of electrical energy. The electromagnet 13 is adapted to attract an armature 14 pivoted on the frame and provided with a feed pawl 141 engaging with the teeth of the ratchet wheel 15, return movement of this armature being effected by a spring 242.

When the electromagnet 13 is energized by the closing of the switch 10, 110, while the plunger is elevated, the armature 14 is attracted and the feed pawl 141, by engaging the ratchet wheel, turns the latter and the plunger and tool connected therewith forwardly one tooth or step but the return movement of this ratchet pawl under the action of the spring 242 is idle. Backward movement of the ratchet wheel is prevented by a detent pawl 61 on the frame.

The depth of the recess formed in the test piece is determined in the present instance by a gauge 6 mounted on a lever or arm 24 pivoted at its rear end on the frame to swing vertically, and a movable shifting pin 62 connected with the indicating mechanism of the gauge 6 and adapted to engage with the upper end of the plunger. The gauge lever 24 is yieldingly held in its elevated position by a spring 244 and the descent of this lever is arrested by a foot 241 thereon adapted to engage with an adjustable stop 243 which preferably consists of a screw mounted on the upper part of the frame. A stream or blast of fluid under pressure, such as water, compressed air or the like is delivered toward the place on the test piece where the same is operated on by the tool, this being practically carried out by a nozzle 16 having its outlet turned toward the place of impact of the tool on the test piece and connected with the lower end of a tubular neck 161 which is guided on the frame and connected with a conduit 63 which supplies the pressure fluid to the nozzle. This latter is yieldingly held in its depressed position by a spring 163 interposed between a collar or shoulder 162 on the nozzle neck and the frame so that by raising the work piece against the nozzle the latter can yield in adapting itself to the working position.

The operation of the device is as follows:—

The article 26 to be tested is placed on the adjustable table 1 and said table raised by means of the handle 2 and worm, worm wheel, pinion and rack arrangement 33, 3, 31, 32, until the article under test touches the tool point 4 and raises the plunger 5 to its "zero" or starting position which is indicated by the gauge 6, on account of the gauge arm 24 at this time resting on the stop 243 and the shifting pin 62 engaging with the upper end of the plunger, as shown in Fig. 1. At the same time the nozzle 16 is raised by the test piece to such a position that the fluid stream issuing therefrom strikes the test article at the point of impact. Then the lever or arm 24 carrying the gauge 6 is moved upward so that the plunger 5 will not strike the gauge on the upward stroke. The switch 25 is normally closed and the operation of the machine started by pressing the push button 7, which closes the supply circuit to the electrical motor 19.

As the rotating contacts 9, 10 and 11 revolve an electrical circuit is completed through 9 and 11 to the solenoid 12, which becomes energized and the resulting magnetic flux causes the plunger 5 to rise to its "up" position. At this instant the circuit to the coil 13 is completed through contacts 9 and 10, the armature 14 is pulled over to the face of the magnet core, thereby moving the ratchet 15 one tooth which rotates the plunger 5 a fraction of a revolution. An instant later the electrical circuit to the coil 13 is broken and the armature 14 returns to its normal position under the action of the spring 242. Then the circuit to the solenoid 12 is broken, the magnetic pull becomes zero and the plunger 5 falls a predetermined distance and the tool point 4 strikes the article under test. A fluid stream issuing from the nozzle 16 removes or renders innocuous the detritus as fast as it is formed by the impact action of the tool. Each succeeding revolution of the rotating contacts causes the above cycle to be repeated and in addition rotates the notched disk or cam 21 a part of a revolution by means of the worm and gear reduction means 17, 71. This action continues until the notch 211 of the timing disk or cam 21 reaches such a position that the pin 22 will move into said notch, thereby permitting the pivoted lever arm 23 to move in a counter clockwise direction and the mercury in the mercury contact switch 18 to move to the lower end of the container and break the supply circuit to the motor 19, thus stopping the machine after a definite number of impact blows have been made The gauge lever or arm 24 is then moved downward into its lowermost position against the stop 243 and the reading on the gauge 6 noted which is now different due to the shifting or tappet pin 62 upon engaging the upper end of the plunger being permitted to descend a greater distance than before the recess was cut in the test piece. The difference in reading on the gauge at the beginning and ending of the drilling operation is the depth of penetration of the tool point in the test piece and is an indication of the toughness or resistance to breakage by impact of the article tested.

Should it be desired to stop the machine before the regular number of blows have been struck, the switch 25 is opened, which breaks the electrical circuit to the electromagnets 12 and 13 but permits the control mechanism to continue its operation under power from the motor 19 until the latter is stopped by the action of the mercury switch 18. After the control mechanism has stopped, the switch 25 is closed and the machine is ready for another test run.

In order to obtain a desired depth of penetration on abrasive and similar bodies of widely varying degrees of toughness it was found necessary to vary the amount of work exerted in the form of impact blows by the falling plunger and cutting tool, this being accomplished by any one or combination of the following methods:—

1. By varying the weight of the plunger.
2. By varying the height of fall of the plunger.
3. By varying the number of impact blows.

The weight of the plunger 5 may be varied by removing said plunger from the machine and adding the desired weight in the form of a light or heavy sleeve 51 which fits over the enlarged center portion of the plunger 5 and may be held in place by means of a set screw 52, as indicated by a dotted line in Figure 1.

The upward movement of the plunger 5 is arrested by a stop collar 8 on the plunger 5 striking the lower part of the solenoid 12. Hence the distance travelled upwardly and the resulting height of fall of said plunger is determined by the distance between the stop collar 8 and the lower part of the solenoid 12. Thus the height of fall may be adjusted to any desired value by shifting the starting point or zero position of the tool 4, this being accomplished by means of the handle 2 with its associated train 33, 3, 31 and 32, which raises the table 1 carrying the test article 26 to such position that the distance between the stop collar 8 and the solenoid 12 conforms to the desired height of fall. At this position the gauge lever 24 is pulled down against the adjustable stop 243 and said stop adjusted so that the gauge 6 reads zero.

The number of impact blows normally delivered by the machine is determined by the ratio of the reduction gear 17 and 71. By pressing the starting button 7 as soon as the machine stops it is a very simple matter to obtain any multiple of the number of impact blows for which the timing device is designed, or any fractional number thereof may be obtained by counting the impacts and manually opening the normally closed switch 25 after the desired number of impact blows have been struck.

We have also found that the same size or shape of tool point will not give accurate results on abrasive bodies of different grit sizes and bonds. In order to obtain comparable results it was found necessary to vary the tool size with the grit size and to maintain a constant shape on said tool point during the testing operation. Further tests show that a special tool point should be used for each range of grit sizes, said tool points being of such sizes that for each corresponding grit size there will be approximately the same number of abrasive particles exposed to each impact blow of the tool point.

Upon testing a quantity of abrasive bodies by the ordinary impact method it has been found that the detritus which was cut away by the tool and collected at the point of impact, acted as a cushion and partially absorbed the force of the blow of the falling spindle and cutting tool. This cushioning effect increased with the depth of penetration and after a number of strokes sufficient detritus had collected to absorb practically all the force of the blow and permit only slight increase in penetration of the cutting tool for succeeding impacts.

It is evident then, that in order to obtain a true indication of the toughness of an abrasive or granular body, when tested by the impact action of a cutting tool, it is necessary to remove the detritus from the point of impact as fast as it is cut away. According to the preferred embodiment of the present invention it is proposed to do this by directing a fluid stream at the point of impact through the nozzle 16 mounted by the tubular neck 161 and supporting bracket on the adjacent part of the frame and removing the detritus as it is broken away from its bed and bond of the abrasive body. This fluid stream being supplied under pressure by the tube 63 removes the detritus continuously and causes a clean surface to be exposed to each impact blow of the cutting tool.

The fluid stream preferably consists of compressed air directed at the point of impact of the cutting tool but the invention is not to be limited to this medium as it has been found that other fluids such as water, oil and the like effectively remove the detritus formed by the impact of the cutting tool. Combinations of fluids, such as a mixture of gases and liquids, under pressure, also remove this detritus by blowing or washing it away from the point of impact.

When the cutting tool of the impact testing machine falls and strikes an abrasive body, from which the detritus made by preceding blows has been removed, this tool will penetrate the same to a greater extent since the tool strikes against a surface which does not yield nor absorb a part of the force of the blow, as would be the case when the tool strikes a layer of detritus in the bottom of the hole. It is therefore evident that the blow of the cutting tool is more effective in penetrating the abrasive body when the detritus has been removed than when it is allowed to remain in the hole drilled by the tool, and therefore permits of more accurately determining the true degree of toughness of the abrasive body. Moreover, a layer of detritus in the hole causes a discrepancy in measuring the depth of penetration of the cutting tool.

It is to be understood that this invention is not limited to testing of abrasive bodies but may also be used to advantage for testing various classes of ceramic products and mineral or granular substances where a test for toughness is required.

We claim as our invention:

1. Apparatus for determining the characteristics of abrasive or similar bodies comprising a frame, a table for supporting a body to be tested, a tool adapted to be raised and dropped on said body, a plunger on which said tool is mounted, a solenoid adapted to elevate the plunger by magnetic force, means for partially rotating said plunger while elevated comprising a ratchet wheel journaled on said frame, a key and spline connection between said ratchet wheel and plunger, and an electromagnet having an armature provided with a pawl adapted to engage said ratchet wheel and rotate same.

2. Apparatus for determining the characteristics of abrasive or similar bodies comprising a support for a body under test, a tool adapted to engage said body by impact, a plunger carrying said tool, a solenoid adapted to raise said plunger, a ratchet mechanism for turning said tool intermittently, an electromagnet for actuating said ratchet mechanism, electric circuits including respectively the winding of the solenoid and the winding of the electromagnet, and a switch mechanism controlling the circuits of said solenoid and electromagnet and operating to cause the solenoid to alternately raise said plunger and tool, and permit them to drop, and the electromagnet to turn the plunger and tool while the same are elevated from the body.

3. An apparatus for determining the characteristics of abrasive or similar bodies, comprising in combination a table for supporting an abrasive article to be tested, a cutting tool mounted for producing successive impacts on said abrasive article by free fall from predetermined heights above said article, a solenoid and switch mechanism for lifting said tool to its original height after each fall and there releasing it, means for rotating the tool to a different angular position between each fall, and means for measuring the penetration of the cutting tool into said abrasive article.

4. Apparatus for determining the characteristics of abrasive or similar bodies, comprising in combination a table for supporting a body under test, a penetrating tool adapted to produce successive impacts on said abrasive article by falling from a predetermined height above said body, electromagnetic means for raising said tool to its original position after each fall and there releasing it, additional electromagnetic means for rotating the tool to a different angular position between each fall, means for controlling said electromagnetic means, comprising a rotary switch in circuit with each of said electromagnetic means, a shaft supporting said rotary switches, an electric motor for driving said shaft, a worm on said shaft, a worm gear in engagement with said worm, a cam driven by said worm gear, a switch in circuit with said electric motor and operated by said cam to stop said motor after a predetermined number of impacts of said tool and means for measuring the penetration of said tool into said abrasive article.

5. In apparatus for determining the characteristics of abrasive or similar bodies, the combination of a reciprocatory motor comprising a core and an electrical device for establishing an electromagnetic field for impelling said core, a penetrating tool connected to the core of said motor and actuated thereby to deliver a blow against a test piece, switch mechanism for controlling said electrical device including timing means for effecting a predetermined number of successive reciprocations of said motor, and means for measuring the depth of penetration of said tool into the test piece.

6. In apparatus for determining the characteristics of abrasive or similar bodies, the combination of a reciprocatory core and a solenoid coil for impelling said core, a penetrating tool connected to said core and actuated thereby to deliver a blow against a test piece, electrical means for rotating said tool to a new angular position between consecutive strokes of the tool, switch mechanism for controlling the solenoid coil and the rotating means for the tool including timing means for effecting a predetermined number of successive reciprocations of said tool, and means for measuring the depth of penetration of said tool into said body after the cessation of the impacts.

7. In apparatus for determining the characteristics of abrasive or similar bodies the combination of a support for a body under test, a penetrating tool adapted to engage said body, a reciprocatory motor of the solenoid type for actuating said tool, and switch mechanism for controlling said reciprocating motor including timing means for effecting a predetermined number of successive reciprocations of the motor and permitting the tool to come to rest after the last impact stroke.

8. In apparatus for determining the characteristics of abrasive or similar bodies, the combination of a support for a body under test, a penetrating tool adapted to engage said body, a reciprocatory motor of the solenoid type for actuating said tool, switch mechanism for controlling said motor to effect a predetermined number of successive reciprocations of the tool and means for delivering a stream of fluid toward the place where the tool engages the body for removing the detritus formed by engagement of the tool with the body.

9. A testing device for determining the resistance of a test piece to disintegration under impact comprising a penetrating tool adapted to engage a test piece, a reciprocatory motor of the electromagnetic type for actuating said tool, switch mechanism for controlling said motor including timing means for effecting a predetermined number of successive reciprocations of said tool, and means for measuring the depth of penetration produced thereby.

10. Apparatus for determining the characteristics of abrasive or similar bodies comprising a penetrating tool adapted to engage a work piece, a support for the test piece, a reciprocatory motor of the solenoid type for actuating said tool, means for adjusting the support to determine the length of stroke of the penetrating tool, and means adjustable to different positions in accordance with the adjustment of the test piece support for measuring the extent to which the tool penetrates the test piece when at rest.

ROMIE LEE MELTON.
JOHN FITZPATRICK.